United States Patent Office 3,232,666
Patented Feb. 1, 1966

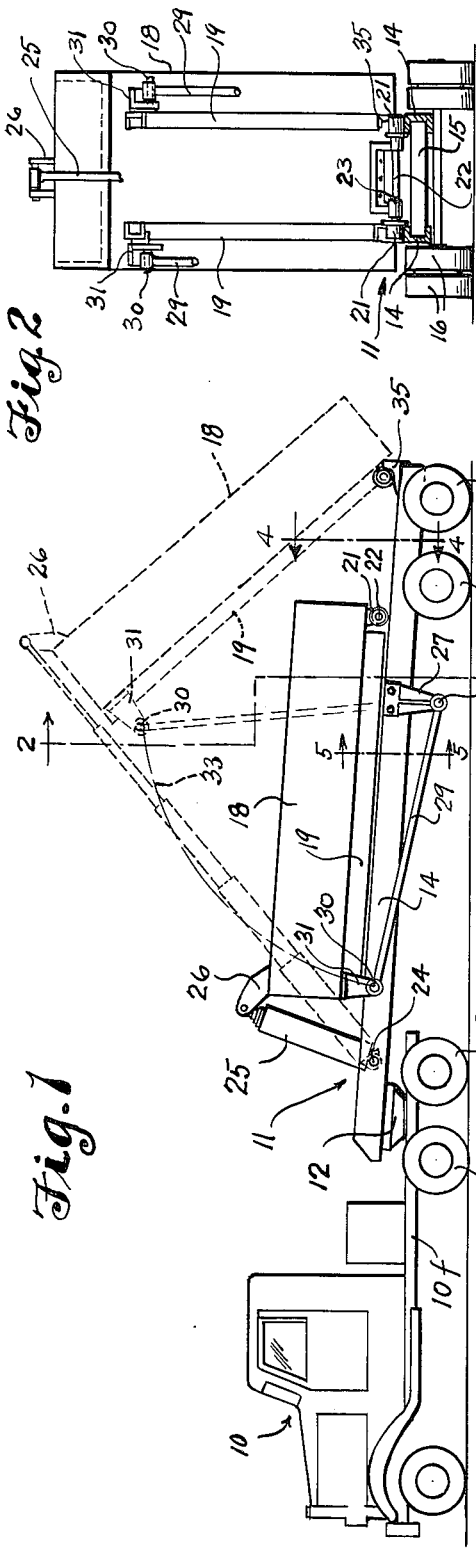

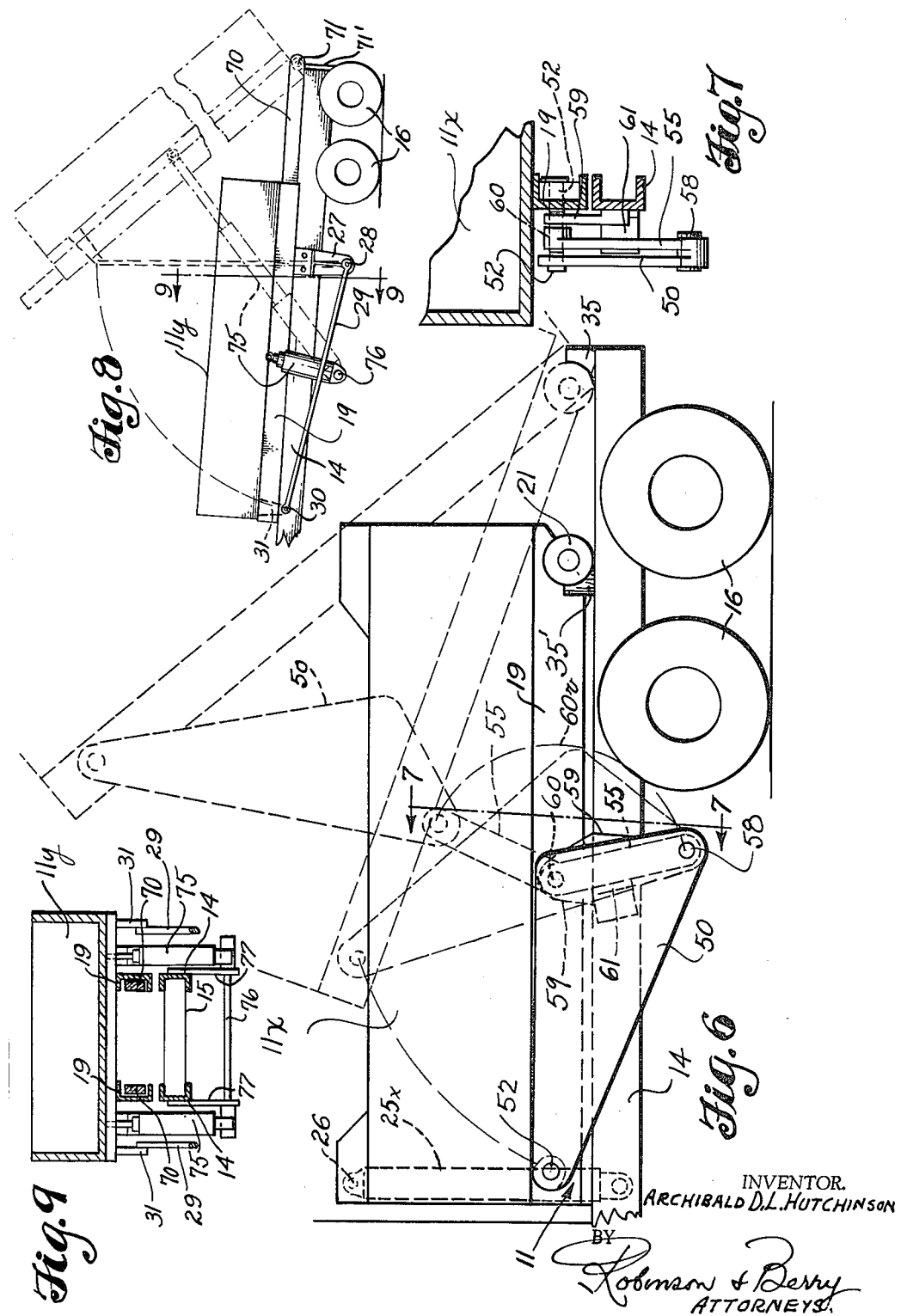

3,232,666
TILTING DUMP BODY SHIFTABLE
ALONG CHASSIS
Archibald D. L. Hutchinson, 2010 Airport Way,
Seattle, Wash.
Filed Dec. 26, 1961, Ser. No. 163,961
4 Claims. (Cl. 298—14)

This invention relates to improvements as applied to mobilized material moving vehicles. More particularly, it relates to improvements in such vehicles as present day automobile trucks, trailers and semi-trailers; any one of which may hereinafter for convenience in explanation, be designated merely as a "truck."

Specifically stated, the present invention pertains to a truck that has a load carrying chassis with a rigid, unitary frame mounting a dump body for limited longitudinal shifting thereon and which truck is equipped with powered mechanism for effecting and controlling the body dumping action with an incident longitudinal body shifting movement for any one of several purposes including that of proper positioning of the body for load dumping; for obtaining better distribution of the load weight on the vehicle relative to its supporting wheels; to obtain better road traction for its powered wheels and for compliance, in some instances, with laws as established by the highway departments of various States of the Union pertaining to the operation of loaded trucks on their highways.

The present invention is herein illustrated and described in its application to a load carrying truck of typical semi-trailer type. However, it is to be understood that it is not to be confined in its use to any specific type of vehicle so long as not inconsistent with the invention.

It is the principal object of this invention to mount a load hauling dump body for limited longitudinal shifting on a rigid, unitary truck frame and to provide novel linkage in conjunction with its powered dumping means for effecting a controlled rearward shifting movement of the dump body on the truck frame incident to its being lifted at its forward end for rear end dumping.

It is a further object of this invention to provide a truck with a typical chassis or frame structure, mounting a load carrying dump body for longitudinal shifting thereon and wherein the shifting of the body rearwardly from its normal load carrying position between the wheeled opposite end supports of the chassis to dumping position is effected by the action of a body dumping hoist operating in conjunction with a body stabilizing linkage that becomes functionally operative for body shifting and stabilization incident to dump body lifting action by the hoist for the rear end dumping of a load.

It is a further object of this invention to provide the present vehicle with a novel application of body shifting and stabilizing linkage that is mounted on the truck frame and wherein the body dumping operation is effected without any upward swinging, jack-knifing or lifting of the truck frame from its normal horizontal position of travel support.

Still further objects and advantages of the present invention reside in the details of construction and in the combination with the truck frame of the body movement controlling parts and in their mode and sequence of their functional operations.

In accomplishing the above mentioned and other objects, of the invention, I have provided the improved details of construction, the preferred forms of which are illustrated in the accompanying drawings, wherein:

FIG. 1 is a side view of a typical automobile truck and semi-trailer assembly with a load carrying dump body mounted on the frame of the semi-trailer for longitudinal shifting movement and for rear end dumping under control of the hoist and the linkage of the present invention; this view showing, in dash lines, the load carrying body in a dumping position.

FIG. 2 is a transverse section, taken on line 2—2 in FIG. 1, showning the relationship of body and its stabilizing linkage, with the dump body as lifted as its forward end for rear end dumping.

FIG. 3 is a perspective view of parts of the semi-trailer frame structure; the body supporting means and body shifting linkage of this invention, as applied to the frame and body.

FIG. 4 is a rear end elevation of the dump body as seen on line 4—4 in FIG. 1, showing its mounting rollers.

FIG. 5 is an enlarged sectional view taken on line 5—5 in FIG. 1.

FIG. 6 is a side view of a truck equipped with a dump body having an alternative form of stabilizing and body shifting linkage.

FIG. 7 is a fragmental cross-section taken on line 7—7 in FIG. 6.

FIG. 8 is a fragmental side view of a dump body with an alternative mounting means and an alternative location for the body dumping jack.

FIG. 9 is a cross-sectional view, taken on line 9—9 in FIG. 8.

Referring more in detail to the drawings:

In FIG. 1, I have shown a load moving assembly comprising an automotive truck 10 and a semi-trailer dump body carrier 11; each of which parts may be of the usual or conventional construction. The rather elongated bed frame structure of the semi-trailer 11 is normally supported in a slightly rearwardly sloping position. At its forward end it is joined to and supported on the rear end of the truck frame 10f by the usual or any suitable fifth-wheel structure 12, to permit those changes in lateral angulation of the frames of the truck and semi-trailer when the vehicle is traveling, as for example, along a winding highway. At its rear end the truck frame is supported by one or more pairs of the usual driving ground wheels, here designated at 13—13. The rigid frame structure of the semi-trailer comprises parallel, laterally spaced opposite side beams 14—14 that are rigidly joined in spaced relationship at intervals therealong by cross-members 15 applied, as for example, in FIG. 3. At its rear end the semi-trailer is supported by the usual sets or pairs of ground wheels 16.

A load carrying body 18, here shown to be of typical dump body form and construction, is supported for ordinary travel by or upon the laterally spaced side beams 14—14 of the semi-trailer 11 at a location between their front and rear end points of support as in FIG. 1. It is mounted for guided travel along the beams between certain forward and rearward limits of travel. It is shown in the several views that the dump body structure 18 includes a pair of laterally spaced, parallel bottom beams 19—19 which terminate at their rear ends, within the rear end limit of the dump body. Located closely to these rearward ends of beams 19—19 and in alignment therewith, the body is equipped with a pair of small diameter supporting wheels 21—21, or the equivalent thereof, mounted on the opposite ends of a cross-shaft 22 which is extended between and mounted by supports 23—23 fixed to the bottom or under structure of the dump body as in FIG. 4. The paired wheels 21—21 are in proper lateral spacing and are designed for guided travel on the top flanges of the parallel, opposite side beams 14—14 of the semi-trailer frame and will move immediately into body supporting contact therewith with any upward lifting of the forward end of the dump body and lift therefrom when the body is fully lowered, it being understood that the body beams 19—19 are so laterally spaced that when the body is fully lowered, they will rest flatly upon the longitudinal beams 14—14 of the semi-trailer chassis to entirely support the dump body structure in the lowered position as in FIG. 1.

Pivotally mounted on the forward end portion of the semi-trailer frame by means here shown to be a cross-rod 24 that extends between the side beams 14—14 of the semi-trailer frame, forwardly of the front end of dump body 18, is a telescopic power hoist 25 which has its extendable outer end section pivotally joined by a bracket 26 as shown in FIG. 1, to the front end wall of the dump body 18.

Fixed in transverse alignment to the opposite side beams 14—14 of the semi-trailer 11 near their rearward ends are vertically downwardly directed brackets 27—27 mounting a cross-rod 28 with its ends extended to opposite sides of the truck. Pivotally mounted on the ends of this rod 28 are the rearward ends of a pair of elongated, rigid links 29—29. These links extend forwardly from their pivotal mountings on the cross-rod 28 along the side beams 19 of the semi-trailer to the same extent and at their forward ends, each is pivotally joined as at 30 to transversely aligned brackets 31—31 extending downwardly from opposite side portions of the dump body bottom structure as best seen in FIG. 3.

It is to be understood, by reference to the showing of parts in FIG. 1, that when the telescopic hoist 25 is fully retracted, the bottom beams 19—19 of the dump body will rest flatly upon the frame beams 14—14. When the hoist is caused to be extended and lifts the forward end of the dump body 18, the upward swing of the body causes its rearward end to be supported by the paired rollers 21—21 on frame beams 14—14 and the forward ends of the elongated links 29—29 to swing upwardly with the lifting of the forward end of the body. As the body swings upwardly, the transversely aligned pivot axes 30 of the links 29 and brackets 31 will follow along an arcuate line 33, shown in FIG. 1. This arcuate line 33 is centered in the axial line of the cross-rod 28 on which the rear ends of the paired links 29—29 are pivoted. Thus, with the upward swing of the front portion of body 18, it is caused by the rearward pull of links 29—29 to be shifted rearwardly, as supported on the frame beams 14—14 by the rollers 21—21. When the rear end supporting rollers 21—21 of the body reach the rear end of their run of travel, as established by wheel stops 35—35 shown in FIGS. 1 and 3 to be applied to the rear ends of the frame beams 14—14, the body 18 can go no farther rearwardly and any farther upward swing by the body hoist 25 is then stopped. It is to be understood that through the links 29—29 the stability of the dump body is maintained during the full dumping and lowering operation.

It is to be emphasized that in the use of the present combination of parts, body dumping action is effected without the usual lifting of the frame structure of the body supporting semi-trailer, and without loss of control at any time, of the semi-trailer or dump body. Dumping action, as powered by the hoist 25, is without detachment of semi-trailer frame from the truck frame and at all times is under control of the hoist 25 and stabilizing toggle linkage 29—29.

The dump truck illustrated in FIGS. 6 and 7 comprises a chassis substantially like that of FIG. 1, in that it has longitudinal opposite side beams 14—14 on which a dump body 11x is mounted for endwise rearward movement for dumping; and is equipped at its rear end with paired rollers or wheels 21 in the same manner as the body shown in FIG. 1; these rollers being movable between rearward and forward limiting stops as at 35 and 35' fixed on the rear end portions of beams 14—14. At its forward end the dump body is equipped with a telescopic jack 25x for its dumping action, similar to that previously described in connection with the body of FIG. 1.

In the alternative structure of FIGS. 6 and 7, the stabilizing linkage comprises a pair of triangular plates 50—50 located in parallel vertical planes at opposite sides of the chassis. At their forward ends these plates 50—50 are pivotally attached by pivot bolts 52 to the bottom structure of the dump body 11x at transversely aligned points near its forward end. At their rearward ends each of these plates is pivotally suspended by paired relatively short links 55—55 which have ends pivotally joined by a pivot bolt 58, as in FIG. 7, for "jack-knife" opening and closing action; each set of joined links 55 being mounted by a pivot bolt 60 through that end opposite bolt 58, fixed in a bracket 59 that is secured to and extended downwardly from the corresponding side beam 14 of the semi-trailer chassis, as shown in FIG. 7, and at its other end, the pivotally joined link set is pivotally secured to the lower rear corner portion of the companion plate 50, as at 58 in FIGS. 6 and 7. In the jack-knifed relationship of the paired links, their pivotally joined ends are upwardly directed when the body 11x is in lowered position.

With the initial up swing of the dump body 11x under influence of the lifting hoist 25x as supported by the carrier frame, the opposite triangular side plates 50—50 will pivot on the bolts 58—58 at their lower rear end corners and on the bolts 52—52 at their forward ends. The links 55—55 at that time will be leaning forwardly against inclined stop brackets 61—61 fixed to the opposite side beams 14—14 of the truck chassis. However, as the dump body swings upwardly, at its forward end, it is caused to be shifted rearwardly by the pivoting of the plates on the pivot bolts 58—58 to ultimately cause the pivot points 52 to swing rearwardly of the alignment of pivots 58 and 60, and this will allow the rearward and upward swinging of the lower ends of links 55 on the pivots 60, as along the arcuate-line 60r in FIG. 6, thus permitting the dump body to swing upward to the extent permitted by the pivotally joined links 55 and plates 50 and to travel upward and rearwardly under the influence of the hoist until stopped by its supporting wheels 21 engaging against the stops 35.

With the lowering of the dump body 11x the joined links 55—55 at opposite sides return along the dash line arcs 60r first to the position at which the links 55 are stopped by engaging the corresponding bracket stops 61 as in FIG. 6, then continued body lowering causes the plates 50 to pivot on their supports 58 and the body 11x to be shifted forwardly to its full line position of FIG. 6 at which position the body supporting wheels 21 engage the forward stops 35' and the body floor beams 19 engage flatly on the longitudinal side beams 14 of the carrying frame.

In the alternative body mounting and dumping arrangement of FIGS. 8 and 9, the dump body 11y and its bottom structure is substantially like that of FIG. 6. However, in this arrangement of parts, a pair of longitudinal channel bars 70 are telescopically contained for endwise sliding movement in the longitudinal bottom beams 19 of the dump body. At their rearward ends these beams 70 are pivoted on a hinge shaft 71 mounted at the rear end of the truck frame by supporting plate 71' fixed to the truck frame. The longitudinal bars 70—70 extend to the full limit of travel of the body 11y on the beams 14—14 of the struck frame.

The body shifting links 29 as used in the device of FIG. 1 are likewise applied and used in this alternative form of device but the dump body 11y is dumped and lowered by a pair of hoists 75 located at opposite sides of the truck or trailer frame and pivotally supported at their lower ends by a cross-axle 76 that is suspended by hanger plates 77—77 fixed to the opposite side beams of the trailer chassis. The jacks 75 are pivoted at their upper ends to the forward end portion of the dump body and beams 19.

In the lifting of the forward end of dump body 11y the links 29 effect its rearward travel along beams 14 and its guided travel along the paired bars 70—70 to the rear end of the semi-trailer frame where stopped by the hinge shaft 71. With the lowering of the body, the links 29, effect its forward travel along the paired bars 70—70 which swing downwardly with the body.

I claim:

1. In a dump vehicle of the character described, a substantially horizontal dump body carrier frame comprising laterally spaced opposite side beams, a dump body disposed upon said carrier frame and adapted for forward and rearward movement thereon between loading and dumping positions, limiting stops fixed on the rear end portions of said laterally spaced side beams in transverse alignment; said dump body having a pair of supporting rollers mounted in transverse alignment at its rear end for rolling travel on said side beams when it is lifted for dumping, paired links disposed at opposite sides of the carrier frame with their forward ends pivotally fixed to the forward end portion of said body and their rear ends pivotally fixed to the opposite side beams of the carrier frame at transversely aligned points below the body level and its limit of travel, a power hoist mounted by the carrier frame and connected with the dump body for lifting it at its forward end about the body supporting rollers at its rear end thus to cause said links to pull the body rearwardly to engage its rear end supporting rollers with the limiting stops for the complete dumping of the body by said hoist; said body supporting rollers being adapted for rolling travel on and along the opposite side beams of the carrier frame during lifting and dumping movement of said body and to lift free from said side beams with the final lowering of the body to rest completely on the carrier frame beams.

2. A combination according to claim 1 wherein the dump body has longitudinally extending parallel bottom beams extended to its rear end and wherein said supports for the dump body comprise transversely aligned rollers that are so mounted on the body beams that they will move into body supporting and rolling contact with the parallel opposite side beams of the carrier frame with the initial upward tilting of the body, and with the final lowering of the body, will lift free from the frame beams and allow the body beams to rest flatly upon the carrier beams.

3. A combination according to claim 1 wherein said body shifting linkage at opposite sides of the carrier frame includes two links with ends pivotally joined together and opening for jackknife folding together, one of said links being pivotally connected at its outer end to the upward swinging end of the dump body and the outer end of the other link being pivotally attached to the longitudinal side beam of the carrier structure at a point forwardly of the body stops to effect rearward shifting of the body as it is lifted for dumping and to limit its upward swinging movement.

4. A combination according to claim 3 wherein stop brackets are fixed to the opposite side beams of the body carrying frame structure against which the pivotally joined links of the body shifting linkage will engage when jackknifed together upon lowering of the body to thus limit their forward swinging travel in a slightly forwardly leaning position to stop forward travel of the body.

References Cited by the Examiner

UNITED STATES PATENTS

| Re. 17,497 | 11/1929 | Robinson | 298—12 |
| 360,799 | 4/1887 | Dunham et al. | 298—14 |
| 961,861 | 6/1910 | Hunt | 298—14 |
| 1,243,635 | 10/1917 | Schulz | 298—16 |
| 1,544,942 | 7/1925 | Schmidt | 298—14 |
| 1,600,614 | 9/1926 | Anthony | 298—12 |
| 2,739,837 | 3/1956 | Sykes | 298—12 X |
| 2,853,341 | 9/1958 | Morse | 298—20 |
| 3,022,111 | 2/1962 | Hutchinson | 298—14 |

FOREIGN PATENTS

| 546,953 | 9/1922 | France. |
| 997,411 | 1951 | France. |

ARTHUR L. LA POINT, *Primary Examiner.*

NELSON M. ELLISON, LEO QUACKENBUSH, MILTON BUCHLER, EUGENE G. BOLT,
*Examiners.*